Nov. 10, 1931.  A. P. BRUSH ET AL  1,831,157
BRAKE MECHANISM
Original Filed Dec. 18, 1922   2 Sheets-Sheet 1
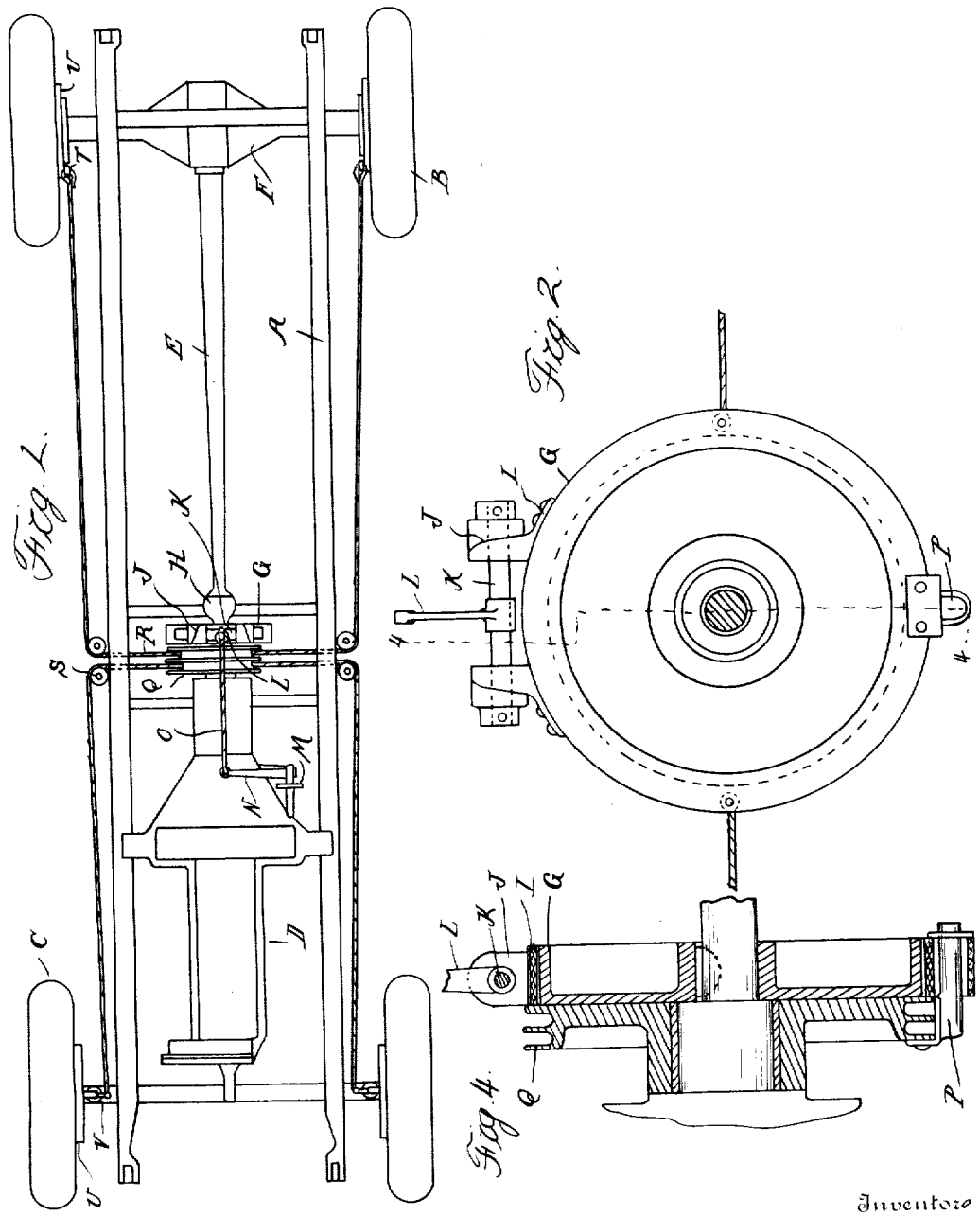
Inventors
Alanson P. Brush
William A. Brush
By Whittemore Hulbert Whittemore Belknap
Attorneys

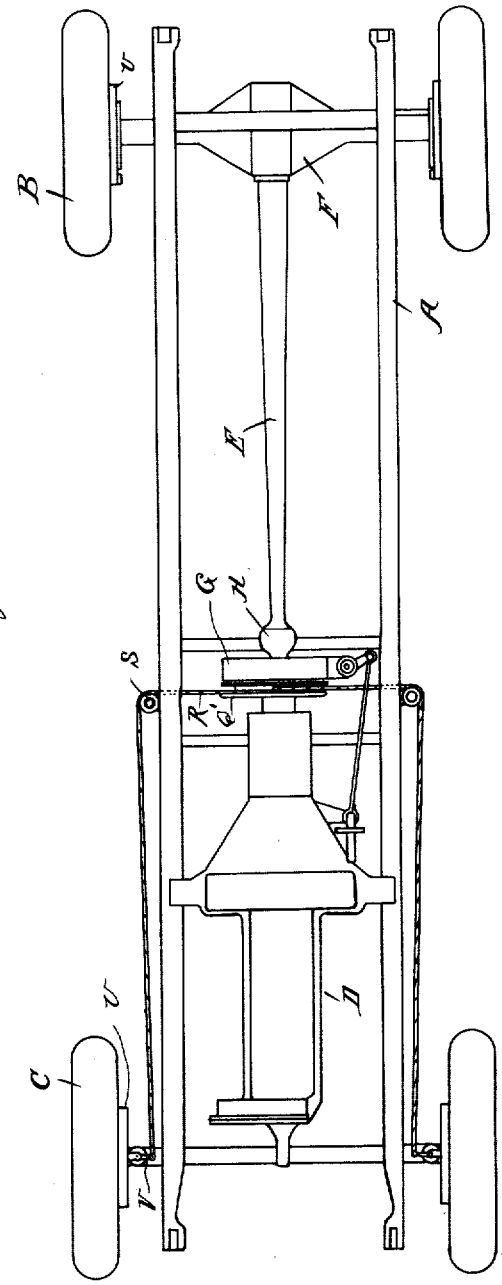

Patented Nov. 10, 1931

1,831,157

UNITED STATES PATENT OFFICE

ALANSON P. BRUSH AND WILLIAM A. BRUSH, OF DETROIT, MICHIGAN

BRAKE MECHANISM

Application filed December 18, 1922, Serial No. 607,668. Renewed November 5, 1928.

The invention relates to vehicle brake mechanisms of that type in which the power for applying the brake is derived in part from the inertia of the driven mechanism. More particularly, the invention is applicable to vehicles having brakes applied to all four wheels, and it is the object of the invention to provide a simple construction of brake mechanism and power actuating means as hereinafter set forth.

In the drawings:

Figure 1 is a diagrammatic plan view of a motor vehicle having brakes applied to all four wheels and provided with our improved power applying mechanism;

Figure 2 is an elevation of the means for deriving the power;

Figure 3 is a view similar to Figure 1 showing a modified construction dispensing with the rear wheel brakes;

Figure 4 is a sectional view on line 4—4 of Figure 2.

In the present state of the art in motor vehicle construction, it is usual to apply brakes only to the driving wheels and to operate such brakes by a pedal. The pedal lever is designed and proportioned to step up the leverage so as to supply the requisite force for operating the two brakes. Also, to compensate for wear in the brake lining, a considerable amplitude of movement in the pedal is required, which is usually as great as convenient for operation.

Where the brakes are applied to the forward or steering wheels as well as to the driving wheels, a proportionate increase in force is necessary. If this force is supplied by the operator, it means either a proportionately greater effort or a further increase in leverage. Neither of these is desirable, for, as above stated, the amount of movement and the force applied for the rear wheel brakes only is about the limit.

With our improved construction the ordinary pedal with the usual amplitude of movement is retained as a controlling means for the brakes, but the force for applying the brakes is supplemented as hereinafter described.

In detail, A is a motor vehicle chassis of any suitable construction having the rear or driving wheels B and the forward or steering wheels C. D is the motor and E the propeller shaft through which power is conveyed to the axle F. G is a rotating member preferably mounted on the propeller shaft in advance of the universal H and provided with a braking surface. I is a brake band surrounding the member G and applied thereto by the actuation of suitable means such as cams J on a rock shaft K having an actuating arm L. M is a pedal mounted in the usual location and connected by suitable means such as the arm N and cable O to the arm L. The brake band I, instead of being anchored to a rigid support, is connected by its anchor pivot P to a movable member, which in turn is connected to the wheel brake actuating means. As specifically shown, the pivot P is secured to a pulley Q having a grooved periphery with cables R wound about the same. These cables extend oppositely from the pulley and after passing about sheaves S, are attached to the actuating levers T of the wheel brakes U. The attachment of the cables is such that a rotation of the pulley Q in either direction from its neutral position will simultaneously apply all four brakes and the force with which these brakes are applied is proportionate to the force applied to the brake I through the medium of the pedal lever M.

The specific construction of the wheel brakes is not essential and any suitable means may be provided for connecting with the brake mechanism on the forward wheels so as not to interfere with the turning of the same. As shown, this is accomplished by arranging the actuating lever V normally close to the axis of the spindle of the steering wheel, so that regardless of the angular position of said wheel the mechanism will be operative.

With the construction described, in operation, any desired braking force may be applied to the wheel brakes by a careful manipulation of the pedal M. This force is not, however, derived from that manually applied to the pedal, but is the kinetic energy of the moving vehicle transmitted through the axle and propeller shaft to the member G and through the brake band I to the pulley Q. Thus, where the pedal pressure is light, the force transmitted from the member G to the pulley Q is proportionately light, and if greater pressure is applied to the pedal, a proportionately greater force will be transmitted to the wheel brakes.

The mounting of the member G directly upon the driven shaft as shown is advantageous in simplifying the construction and in deriving the force from the momentum of the car independently of any operation of the motor. It frequently happens that the application of the brakes is necessary when the motor is not running and this contingency we have provided for with our construction. On the other hand, if the vehicle is on a grade and should start to move, the application of the brake I will effect the setting of the wheel brakes to prevent further movement.

One important feature of our invention is that it precludes the possibility of applying braking force to the front wheels in advance of the application of such braking force to the rear wheels. There is an element of danger in the use of 4-wheel brakes as ordinarily constructed, for the reason that any retarding of the front wheels in advance of the rear is likely to cause the vehicle to skid. On the other hand, if the braking force is first applied to the rear wheels and then supplemented by braking the front wheels, the vehicle can be brought to a stop in a much shorter space than where applied only to one set of wheels.

With our construction the application of the brake band I to the rotating member G will first place a retarding action on the propeller shaft, which is transmitted to the rear wheels and only after such force is applied is there any action for applying the wheel brakes. Thus, if desired, and as shown in Figure 3, the rear wheel brakes may be entirely dispensed with and the braking force for the rear wheels and axle applied solely to the propeller shaft. In this modification the pulley Q' need only be provided with a single peripheral groove instead of the two grooves as shown in Figure 1. Otherwise the construction operates in the same manner as that illustrated in Figure 1. With either this construction or the one previously described there will be no danger of arresting movement of the front wheels in advance of the rear.

What we claim as our invention is:

1. The combination with a wheeled vehicle having a propeller shaft and wheel brakes, of a brake drum directly mounted on said propeller shaft to rotate therewith, a brake band surrounding said brake drum, a rotatable pulley mounted coaxially of said brake drum, means connecting said brake band and said pulley, cables secured to said pulley and extending radially of the same when said brake band is in normal position, and means for contracting said brake band about said brake drum to frictionally engage the same and to actuate said wheel brakes through the reaction of said pulley.

2. The combination with a vehicle having driving and steering wheels, of a propeller shaft for actuating said driving wheels, a brake mechanisms on each of said wheels, a brake drum directly mounted on said propeller shaft to rotate therewith, an independently rotatable pulley coaxially mounted on said propeller shaft, a brake band surrounding said brake drum and anchored to said pulley, cables extending radially of said pulley and connected to said wheel brakes, and means for actuating said brake band to frictionally engage said brake drum and to thereby actuate said wheel brakes upon movement of said vehicle in either direction.

3. A vehicle having, in combination, front wheels having brakes, rear driving wheels, and braking means for said rear wheels operated by the braking torque derived therefrom in either direction of wheel rotation to apply the front wheel brakes.

4. A vehicle having, in combination, one set of wheels having brakes, another set of wheels, and braking means for said other wheels operated by the braking torque derived therefrom in either direction of wheel rotation to apply the brakes of the first set of wheels.

5. A vehicle having, in combination, front wheels having brakes, rear wheels, and driving mechanism for the rear wheels, provided with a brake acting on the rear wheels through said mechanism, and operated by the braking torque derived by the reaction through said mechanism on the brake to apply the brakes on the front wheels.

6. A vehicle having, in combination, front wheels having brakes, driving mechanism including a rotatable member, a friction device engageable with the rotatable member, and flexible operating elements connected to said friction device and extended directly into operative connection with the respective front wheel brakes.

7. A motor vehicle having a braking system operable when the vehicle is at rest or in motion and a second braking system operable through the first braking system subsequent to and in conjunction with said first braking system when the vehicle is in motion in either direction said second braking system being adapted to brake a different set of wheels from the first braking system.

8. A motor vehicle having rear wheel brakes and front wheel brakes, operating means for the front wheel brakes, said means including an instrumentality responsive to a predetermined turning movement of the rear wheel brake in either direction during the application thereof.

In testimony whereof we affix our signatures.

ALANSON P. BRUSH.
WILLIAM A. BRUSH.

CERTIFICATE OF CORRECTION.

Patent No. 1,831,157.  November 10, 1931.

ALANSON P. BRUSH ET AL.

It is hereby certified that error appears in the printed specification of the above numbered patent requiring correction as follows: Page 2, line 113, claim 5, for the word "operated" read caused; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.

direction said second braking system being adapted to brake a different set of wheels from the first braking system.

8. A motor vehicle having rear wheel brakes and front wheel brakes, operating means for the front wheel brakes, said means including an instrumentality responsive to a predetermined turning movement of the rear wheel brake in either direction during the application thereof.

In testimony whereof we affix our signatures.

ALANSON P. BRUSH.
WILLIAM A. BRUSH.

CERTIFICATE OF CORRECTION.

Patent No. 1,831,157.    November 10, 1931.

ALANSON P. BRUSH ET AL.

It is hereby certified that error appears in the printed specification of the above numbered patent requiring correction as follows: Page 2, line 113, claim 5, for the word "operated" read caused; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.